US011741239B2

(12) United States Patent
Swearingen

(10) Patent No.: US 11,741,239 B2
(45) Date of Patent: Aug. 29, 2023

(54) BLOCKCHAIN-BASED HOURS-OF-SERVICE SYSTEM

(71) Applicant: OMNITRACS, LLC, Dallas, TX (US)

(72) Inventor: Aaron Swearingen, Crystal, MN (US)

(73) Assignee: OMNITRACS, LLC, Dallas, TX (US)

( * ) Notice: Subject to any disclaimer, the term of this patent is extended or adjusted under 35 U.S.C. 154(b) by 284 days.

(21) Appl. No.: 16/163,022

(22) Filed: Oct. 17, 2018

(65) Prior Publication Data
US 2020/0126321 A1  Apr. 23, 2020

(51) Int. Cl.
G06Q 20/00 (2012.01)
G06F 21/60 (2013.01)
G06Q 30/018 (2023.01)
G07C 5/08 (2006.01)
G07C 5/02 (2006.01)
G06Q 10/063 (2023.01)
G06Q 30/02 (2023.01)
G06F 21/64 (2013.01)
G06Q 50/30 (2012.01)
G07C 5/00 (2006.01)
H04L 9/32 (2006.01)

(52) U.S. Cl.
CPC ............ *G06F 21/60* (2013.01); *G06F 21/602* (2013.01); *G06F 21/64* (2013.01); *G06Q 10/063* (2013.01); *G06Q 30/018* (2013.01); *G06Q 30/0281* (2013.01); *G06Q 50/30* (2013.01); *G07C 5/02* (2013.01); *G07C 5/085* (2013.01); *G06Q 2220/00* (2013.01); *G06Q 2220/12* (2013.01); *G07C 5/008* (2013.01); *H04L 9/3247* (2013.01)

(58) Field of Classification Search
USPC ................... 705/16, 21, 59, 71; 380/44, 262
See application file for complete search history.

(56) References Cited

U.S. PATENT DOCUMENTS 5,699,257 A * 12/1997 Emmett ........... G07B 17/00508
400/159
6,246,967 B1 * 6/2001 Libicki ................. G01G 19/02
702/175

(Continued)

FOREIGN PATENT DOCUMENTS

CN          107274130 A     10/2017
WO    WO-2013058663 A2 *  4/2013  ............. G06F 21/64

(Continued)

OTHER PUBLICATIONS

International Search Report and Written Opinion issued for corresponding international application No. PCT/US2019/051317 dated Dec. 12, 2019.

(Continued)

*Primary Examiner* — Dante Ravetti
(74) *Attorney, Agent, or Firm* — ArentFox Schiff LLP

(57) ABSTRACT

The described features of the present disclosure generally relate to one or more improved systems for recording and managing the electronic information associated with driving activities (e.g., driver log information) obtained from the one or more mobile computing platforms (ELDs) associated with one or more vehicles in a distributed ledger managed by a blockchain network. Accordingly, features of the present disclosure provide a secure and tamper-resistant way to manage driver log records for audit and compliance purposes.

12 Claims, 5 Drawing Sheets

(56) References Cited

U.S. PATENT DOCUMENTS

| | | | | |
|---|---|---|---|---|
| 6,529,883 | B1* | 3/2003 | Yee | G06Q 50/06 |
| | | | | 705/401 |
| 7,117,075 | B1* | 10/2006 | Larschan | G07C 5/085 |
| | | | | 701/29.6 |
| 8,509,987 | B2 | 8/2013 | Resner | |
| 9,947,147 | B1* | 4/2018 | Kwak | G07C 5/085 |
| 10,719,800 | B2* | 7/2020 | Kwak | B60W 50/14 |
| 2006/0041750 | A1* | 2/2006 | Carter | H04W 12/037 |
| | | | | 713/168 |
| 2006/0206433 | A1* | 9/2006 | Scoggins | G06Q 50/06 |
| | | | | 705/63 |
| 2006/0271244 | A1* | 11/2006 | Cumming | G01R 21/133 |
| | | | | 700/291 |
| 2007/0038343 | A1* | 2/2007 | Larschan | G07C 5/04 |
| | | | | 701/31.4 |
| 2007/0038348 | A1* | 2/2007 | Larschan | G07C 5/04 |
| | | | | 701/32.4 |
| 2008/0097812 | A1* | 4/2008 | Davis | G06Q 10/0835 |
| | | | | 705/7.12 |
| 2008/0152136 | A1* | 6/2008 | Kashihara | G07C 5/0858 |
| | | | | 380/200 |
| 2008/0188217 | A1* | 8/2008 | Harter | G06Q 10/00 |
| | | | | 455/426.1 |
| 2009/0299567 | A1* | 12/2009 | Larschan | G06Q 10/06 |
| | | | | 701/29.2 |
| 2011/0314148 | A1 | 12/2011 | Petersen et al. | |
| 2013/0185132 | A1* | 7/2013 | Hogg | G06Q 20/209 |
| | | | | 705/14.27 |
| 2013/0314249 | A1* | 11/2013 | Le Buhan | G01D 4/002 |
| | | | | 340/870.02 |
| 2014/0207309 | A1* | 7/2014 | Armitage | G07C 5/085 |
| | | | | 701/1 |
| 2014/0368601 | A1 | 12/2014 | Decharms | |
| 2017/0041148 | A1 | 2/2017 | Pearce | |
| 2017/0317997 | A1 | 11/2017 | Smith et al. | |
| 2018/0018723 | A1 | 1/2018 | Nagla et al. | |
| 2018/0061237 | A1* | 3/2018 | Erickson | G08G 1/0129 |
| 2018/0091596 | A1* | 3/2018 | Alvarez | H04L 63/0428 |
| 2018/0131765 | A1* | 5/2018 | Puleston | G06K 7/10366 |
| 2018/0165247 | A1* | 6/2018 | Flies | G07C 5/085 |
| 2018/0287797 | A1 | 10/2018 | Banerjee et al. | |
| 2018/0294970 | A1* | 10/2018 | Barreau | H04L 9/3247 |
| 2018/0308295 | A1* | 10/2018 | Kwak | G06F 9/453 |
| 2018/0374283 | A1* | 12/2018 | Pickover | G07C 5/085 |
| 2019/0014111 | A1* | 1/2019 | Votaw | G06Q 20/12 |
| 2019/0236510 | A1* | 8/2019 | Kwak | G07C 5/0841 |
| 2019/0236863 | A1* | 8/2019 | Kwak | G07C 5/0808 |
| 2019/0258999 | A1* | 8/2019 | Leonard | G06Q 10/06312 |
| 2020/0126321 | A1* | 4/2020 | Swearingen | G06Q 30/018 |
| 2020/0184404 | A1* | 6/2020 | Mezaael | H04L 9/0643 |
| 2020/0307610 | A1* | 10/2020 | Lerner | H04L 9/3236 |
| 2020/0342399 | A1* | 10/2020 | Koppinger, III | G06Q 30/018 |

FOREIGN PATENT DOCUMENTS

| | | | |
|---|---|---|---|
| WO | | 2007017806 A1 | 1/2017 |
| WO | WO 2017/180382 | A1 | 10/2017 |
| WO | WO 2018/026807 | A1 | 2/2018 |

OTHER PUBLICATIONS

European Search Report issued in corresponding European Application No. 19872489.0 dated May 13, 2022.

Bashir Imran: "Mastering Blockchain" In: Mastering Blockchain Mar. 17, 2017 (Mar. 17, 2017), Packt Publishing, XP055872144, ISBN: 978-1-78712-544.5 *whole document*.

Anonymous: "White paper. ethereum/wiki Wiki.Github", Apr. 29, 2015 (Apr. 29, 2015), pp. 1-36, XP055867187, Retrieved from the internet: URL:https: //github.com/ethereum/wiki/wiki/white-paper/360aef3c3a1127a9cbec0339ea44923cf6843a8 [retrieved on Nov. 29, 2021] *the whole document*.

"How Blockchain Is Changing the Auto Industry," 12 pages. http://www.archer-soft.com/en/blog/how-blockchain-changing-auto-industry.

Dills, "Blockchain: Better tools to fight detention abuse, with added utility for driver, carrier credentials," Jan. 9, 2018, 5 pages. https://www.overdriveonline.com/blockchain-better-tools-to-fight-detention-abuse-with-added-utility-for-driver-carrier-credentials/.

Holder, "How Blockchain Technology Could Transform Trucking," Sep. 21, 2017, 8 pages. https://www.trucks.com/2017/09/21/blockchain-technology-transform-trucking/.

Jones, "Blockchain for Automotive," Mar. 23, 2017, 10 pages. https://www.IBM.com/blogs/internet-of-things/blockchain-for-automotive/.

Samavi, "Blockchain Enabled Privacy Audit Logs," Oct. 4, 2017, 7 pages. https://link.springer.com/chapter/10.1007%2F978-3-319-68288-4_38.

* cited by examiner

BLOCKCHAIN-BASED HOURS-OF-SERVICE SYSTEM

BACKGROUND

Truck drivers across the United States presently operate under regulations promulgated by the Department of Transportation (DOT) and the Federal Motor Carrier Safety Administration (FMCSA). The DOT and FMCSA regulate many aspects of the transportation industry ranging from vehicle maintenance to substance abuse. One of the more important areas that the DOT and FMCSA monitor is the occurrence of truck-related accidents and ways to reduce the number of such accidents. Driver fatigue has been cited by the DOT and FMCSA as being one of the primary causes of truck-related accidents. Consequently, the FMCSA has adopted regulations that limit the number of hours that truck drivers may operate a vehicle over a given time period. For example, the DOT prohibits any driver from driving a commercial vehicle in excess of 10 hours after 8 hours of rest.

To ensure compliance with these safety regulations, the FMCSA also requires drivers to keep Hours of Services (HOS) records, i.e., detailed written records of the number of hours driving, on-duty but not driving, resting, and off-duty. Drivers must provide daily updates, detailing the number of hours spent in each of the four categories mentioned above. Instead of a traditional log book, modern carriers use Electronic Logging Device (ELD) systems to automatically record the amount of time spent driving the vehicle.

Federal officials periodically inspect driver logbooks or ELD system data at weigh stations and other locations to certify that they have been kept up-to-date by the driver, and that the driver is following the FMCSA mandated regulations. If a driver is found to be out of compliance with the FMCSA regulations, they will not be permitted to continue driving until the proper amount of off-duty or rest time has elapsed. This results in late deliveries to customers and general inefficiency for the driver's employer. The driver is also penalized because the mandated "rest" time affects the hours that he/she is able to work. If a number of violations occur over a given time period, substantial fines may be levied against the driver and/or employers.

Thus, improvements in ELD systems are desired.

SUMMARY

The following presents a simplified summary of one or more aspects of the present disclosure in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the present disclosure in a simplified form as a prelude to the more detailed description that is presented later.

The present disclosure relates to an improved ELD system, which ensures the hours-of-service records are distributed between vehicles, the centralized database warehousing the records, roadside inspectors (e.g., stationed at weigh stations), and the government regulators (e.g., FMCSA) in a way that is highly secure and tamperproof.

Thus, in accordance with aspects of the present disclosure, a method and system of recording driver log information in a distributed ledger is disclosed. In an example, a transport log system includes a processing system for: receiving driver log information associated with one or more drivers respectively corresponding to one or more vehicles, wherein the driver log information contains hours-of-service data associated with the driver; generating a blockchain transaction data structure containing the hours-of-service data; and publishing the blockchain transaction data structure to a blockchain network, wherein the transport driver log system is a node within the blockchain network.

To the accomplishment of the foregoing and related ends, the one or more aspects of the present disclosure comprise the features hereinafter fully described and particularly pointed out in the claims. The following description and the annexed drawings set forth in detail certain illustrative features of the one or more aspects of the present disclosure. These features are indicative, however, of but a few of the various ways in which the principles of various aspects of the present disclosure may be employed, and this description is intended to include all such aspects and their equivalents.

BRIEF DESCRIPTION OF THE DRAWINGS

The disclosed aspects of the present disclosure will hereinafter be described in conjunction with the appended drawings, provided to illustrate and not to limit the disclosed aspects, wherein like designations denote like elements, where a dashed line may indicate an optional element or action, and in which.

DETAILED DESCRIPTION

Figure 1:
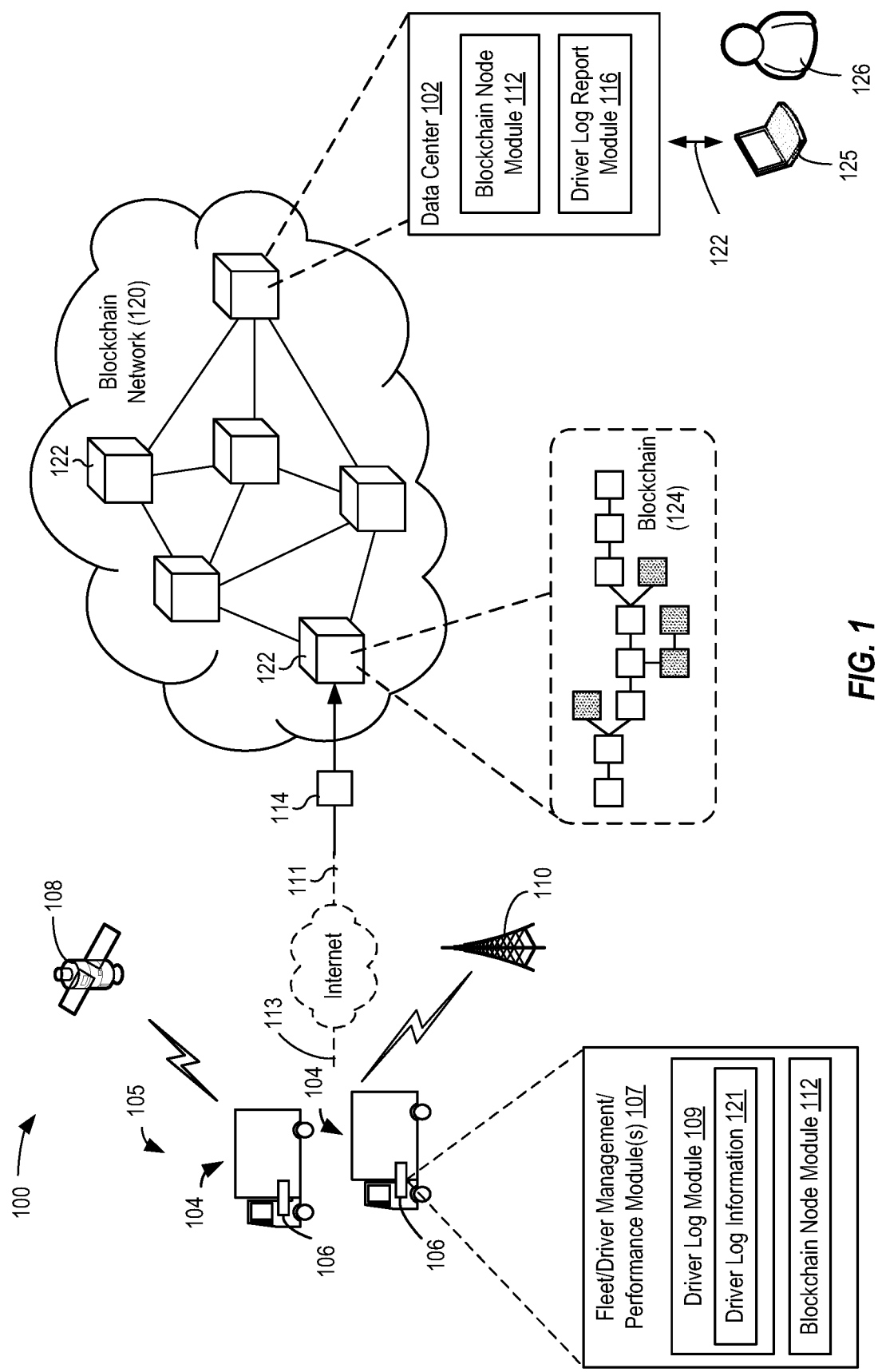
FIG. 1 is a schematic block diagram of example elements of an aspect of a system including a blockchain network for storing and validating driver log information collected by a respective driver log module of a respective electronic logging device (ELD) associated with each vehicle or each driver.

As discussed above, data authenticity and security of driver log information is an issue in the trucking industry. To address such issues, present disclosure provides techniques for recording and publishing electronic information associated with driving activities (e.g., driver log information) obtained from the one or more electronic logging devices (ELD) associated with one or more vehicles to a distributed data ledger or blockchain.

One example of an ELD may be Intelligent Vehicle Gateway (IVG) by Omnitracs Inc. or any mobile computing platform capable of tracking hours of service data.

Particularly, in accordance with government regulations, drivers are required to maintain accurate record of their driving activities (e.g., how much and how often a truck driver may drive). To this end, electronic logging systems for tracking, managing and maintaining driver log information for a fleet of portable assets have been developed. These electronic logging systems may assist a fleet operator and/or truck driver to accurately maintain driver logs that may identify, for example, time periods when the driver is on-duty and driving, on-duty but not driving, off-duty, and resting/sleeping, referred to herein as driver log information. In some aspects, ELD devices located in a cab and/or trailer of a vehicle transporting a portable asset may aid the truck driver in managing the driver log information. In some examples, the ELD device may offer a user interface to the truck driver to allow the truck driver to enter and/or track the required driver log information to record the driver activity. Additionally or alternatively, the ELD device may automatically measure or determine at least a portion of the driver log information (e.g., on-duty and driving, on-duty but not driving, off-duty, and resting/sleeping), for example, based on an initial driver entered indication and maintaining a timer, and/or based on a number of sensors that collect and report vehicle performance data to the ELD.

Aspects of the present disclosure provide a new, secure manner to record and publish driver log information in contrast to traditional centralized databases and data warehouses. In particular, the present disclosure includes a blockchain network having a plurality of nodes, some of which may be the ELDs themselves, which use cryptographic techniques to manage a distributed ledger or blockchain of driver log information. The blockchain of driver log information may be more resistant to modification, corruption, or loss of the driver log information than a traditional, centralized database of driver log information. As a result, a blockchain of driver log information may be a more reliable source of information that is the subject to government regulation and scrutiny, such as during logbook audits at weigh stations. Moreover, the blockchain of driver log information provides a decentralized source for the driver log information with increased availability when compared to databases, which can be single points of failure.

Various aspects are now described in more detail with reference to the FIGS. 1-5. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1, in an aspect, a system 100 includes modules for collecting, analyzing and presenting fleet and/or driver management or performance data, including a blockchain node module 112 configured to publish driver log information 121 received from one or more driver log modules 109 associated with one or more vehicles 104 to a blockchain network 120. As used herein, the terms "module(s)" may be one of the parts that make up a device, may be hardware or software or firmware, and may be divided into other modules and/or distributed across one or more processors.

In an aspect, system 100 can comprise a blockchain network 120 configured to communicate with one or more vehicles 104 via a ELD 106 located on each vehicle 104 or associated with each driver of each vehicle 104. The system 100 may include one or more fleets of vehicles 104, each fleet having at least one vehicle. Typically, a fleet could include many tens, hundreds or thousands of vehicles. An example fleet 105 is illustrated as having two vehicles 104. Additional fleets (not shown) are contemplated, but not shown. In implementations, each ELD 106 is configured to collect and transmit data associated with the driver and/or the operation of the vehicle 104 to the blockchain network 120. Also, in some implementations, ELD 106 can be configured to perform calculations associated with one or more fleet and/or driver management or performance module(s) 107 using any of the collected data. In an aspect, fleet and/or driver management or performance module(s) 107 may be implemented as a software application defined by code or instructions stored in a computer-readable medium and executed by a processor, and/or as hardware (e.g., a specially programmed processor module), and/or as firmware. According to the present aspects, one of the fleet and/or driver management or performance module(s) 107 may include driver log module 109, also referred to as an "Hours of Service module," which is configured to collect driver log information 121, and a blockchain node module 112 configured to transmit the driver log information 121 to the blockchain network 120, as will be discussed in more detail below.

In some implementations, ELD 106 may include a processor configured to execute one or more fleet and/or driver management or performance modules 107, one or more transceivers to perform associated communications with external devices such as the blockchain network 120 via a communication network, and a memory configured to store computer-readable code that may define all or part of the modules 107 and also to store data associated with the components 107 and/or ELD 106. ELD 106 may also include a user interface or display, a mobile application server, and a communications module (e.g., including the one or more transceivers, and one or more of terrestrial and Wi-Fi modems, one or more antennae, a GPS module, and a satellite communications module). For example, in an aspect, ELD 106 may include, but is not limited to, the Intelligent Vehicle Gateway (IVG) platform sold by OMNITRACS LLC of Dallas, Tex., which may include fleet and/or driver management or performance modules 107 such as, but not limited to, a driver log module 109, an Analytics Manager module, a Critical Event Reporting module, a Driver Workflow module, an Extended Productivity Suite module, a Fault Monitoring module, an In-Cab Navigation module, an In-Cab Scanning module, an In-Cab Video Training module, a Media Manager module, a Performance Monitoring module with a Fuel Manager module, a Predictive Performance Service module, a Trip Manager module, a Vehicle Maintenance and Inspection Reporting module, a Web Browsing module, and a Telematics module.

As an example only, each vehicle 104 may be in bi-directional communication with at least one node of the blockchain network 120 over at least one communication channel. In the example shown in FIG. 1, each vehicle 104 is in bi-directional communication with the blockchain network 120 over at least one of a satellite-based communication system 108 and a terrestrial-based system 110 (e.g., a wireless communication system using a communication protocol/technology such as, but not limited to, 5G or New Radio (NR), GSM, CDMA, TDMA, WCDMA, EDGE, OFDM, GPRS, EV-DO, LTE, WiFi, Bluetooth, or, when the vehicle is stopped, via a wired connection 113 through the Internet). Depending on many factors, data may be exchanged with the vehicles 104 using one or both of the satellite communication system 108 and the terrestrial-based communication system 110.

In an aspect, many different types of data are collected and transmitted from the vehicles 104 to the blockchain network 120. Examples of such data include, but are not limited to, driver performance data, driver duty status such as driver log information 121, truck performance data, critical events, messaging and position data, location delivery data, telematics data, and other types of data. As noted, the data associated with the operation of the vehicle 104 may further include driver log information 121 collected by the driver log module 109. In some examples, the driver log module 109 may employ the user interface or display of the ELD 106 to allow a truck driver, for example, to enter relevant driver log information 121 (e.g., on-duty and driving, on-duty but not driving, off-duty, resting/sleeping, etc.) for one or more sampled time points into the ELD 106. For instance, the driver may provide an entry upon a change in driver log information 121 (e.g., a change in a driver state from one to another of on-duty and driving, on-duty but not driving, off-duty, resting/sleeping, etc.), and driver log module 109 may include a timer that maintains a history of how long the driver was in each driver state. For instance, in one example that should not be construed as limiting, each driver state recorded in the driver log information 121 may be represented by a log code (e.g., code having a value of: 1=off duty, 2=sleeping, 3=driving, 4=on duty but not driving, 5=yards moved, 6=personal conveyance), and driver log module 109 may track which log code applies to the driver for each sampled time point, such as, for example, for each minute of the day. As such, in one non-limiting example, driver log module 109 may track the driver log information 121 in a manner that represents the 24 hours in a driver's day as a sequence of 1440 codes, where the sequence corresponds to some combination or sequence of different log code values (e.g., 1=off duty, 2=sleeping, 3=driving, 4=on duty but not driving, 5=yards moved, 6=personal conveyance).

According to an exemplary aspect, rather than use a single data repository that receives all data that is exchanged with the vehicles 104, aspects of the present disclosure use a blockchain network 120 which is a distributed peer-to-peer network formed from a plurality of nodes 122 or computing devices, that collectively maintain a distributed ledger, also referred to as a blockchain 124. The blockchain 124 is a continuously-growing list of data records hardened against tampering and revision using cryptography and is composed of data structure blocks that hold the data received from other nodes (e.g., ELDs 106). The nodes 122 of the blockchain network 120 may include one or more back-end servers, such as those maintained in a data center 102, and other computing devices. Although depicted in FIG. 1 as separate from the blockchain network 120, the ELDs 106 within the vehicles 104 may themselves be nodes 122 of the blockchain network. The nodes 122 of the blockchain network 120 may also include terminals, computers, and servers located at weigh stations used to audit driver log information, as well as servers managed by regulatory organizations (FMCSA).

In one aspect, the blockchain node module 112 of the ELD may be configured to generate and transmit a transaction data structure 114 containing data values related to driver log information to the blockchain network 120, and a node in the blockchain network 120 records and confirms when and in what sequence the data transactions enter and are logged in the existing blockchain. Every node 122 in the decentralized system can have a copy of the growing blockchain 124, avoiding the need to have a centralized data store managed by a trusted third party. Moreover, each of the nodes 122 can validate the data, add hash values to their copy of the blockchain 124, and then broadcast these additions to other nodes in accordance with blockchain-related methodologies. In some aspects, the blockchain network 120 may be comprised of a mixture of "full" nodes and "partial" nodes. Full nodes may process the full blockchain and are validating and enforcing data integrity of the blockchain on a regular basis. Partial nodes, in contrast, are configured to interact with the blockchain in a lightweight manner, for example, by downloading block headers, and verifying only a small portion of what needs to be verified, using a distributed hash table as a database for trie nodes in place of its local hard drive. In one aspect, the ELDs 106 may be configured as partial nodes of the blockchain network, while other designated servers in the system 100 may be configured as full nodes.

In one aspect, the blockchain node module 112 of the ELD may be configured to manage the driver log information by maintaining a set of private and public encryption key pairs tied to the driver, and create and sign blockchain transactions involving the driver log information using those encryption keys. The holder of the private encryption key (e.g., the ELD) is able to sign records of driver log information, which are then put into force by being permanently recorded in the blockchain 124.

All of the information that is communicated to and from the vehicles 104 may be published to the blockchain network 120. In some aspects, the collected information (e.g., driver log information 121) may periodically (e.g., every x minutes, where x is a whole number, or once a day, or upon availability of a wired or wireless connection) be transmitted from the ELD 106 to the blockchain network 120 for record keeping.

In one aspect, one of the fleet and/or driver management or performance module(s) 107 may include a blockchain node module 112 configured to receive the driver log information 121 associated with one or more drivers respectively corresponding to one or more vehicles 104, which contains hours-of-service data associated with the driver. As described in greater detail below, the blockchain node module 112 may generate a blockchain transaction data structure that contains the hours-of-service data, and publishes the blockchain transaction data structure to the blockchain network 120.

The system 100 also includes a data center 102, which may be part of or in communication with the blockchain network 120. The data center 102 illustrates one possible implementation of one or more node(s) 122 for storing all of the data received from each of the vehicles 104. As an example, as mentioned above many different types of data are transmitted from the vehicles 104 to the data center 102. In the case where data center 102 is in communication with other nodes of the blockchain network 120, the data may be transmitted via connection 111 to the data center 102. The connection 111 may comprise any wired or wireless dedicated connection, a broadband connection, or any other communication channel configured to transport the data. In an aspect, the data center 102 may include a processor, memory including volatile and non-volatile memory, specially-programmed operational software, a communication bus, an input/output mechanism, and other operational systems.

In an aspect, the data center 102 may include its own blockchain node module 112 for interacting with the other nodes of the blockchain network to maintain the blockchain ledger, as well as receive and verify published driver log data. In an aspect, the data center 102 may include a driver log report module 116 configured to retrieve and analyze driver log data from the blockchain (e.g., using the blockchain node module 112) and generate fleet and/or driver management or performance metrics. According to the present aspects, the driver log report module 116 may aid in determining compliance with transportation regulations that govern drivers' hours-of-service based on driver log information 121 collected from driver log module 109 and the blockchain. The driver log report module 116 may capture, manipulate, and provide this information in a usable format, for example, over connection 122 for output on a display or printer associated with a terminal device 125. The terminal device 125 can be a user interface portal, a web-based interface, a personal computer (PC), a laptop, a personal data assistant (PDA), a dedicated terminal, a dumb terminal, or any other device over which a user 126 (e.g., a manager or operator responsible for monitoring a fleet 105 of vehicles 104; or a vehicle inspector at a weigh station) can view the display or receive a printed report provided by driver log report module 116.

It should be noted that the example implementation illustrated in FIG. 1 should not be construed as limiting, as one of skill in the art may modify this implementation and achieve similar results. For instance, rather than the illustrated modules and described functionality for publishing blockchain transactions containing driver log information 121 directly to the blockchain network from an ELD 106, the functionality described herein may instead be implemented by an intermediary publishing node (e.g., executing in a data center 102) which receives driver data from the ELDs 106 and handles the blockchain-related tasks of verifying blockchain records.

Figure 2:
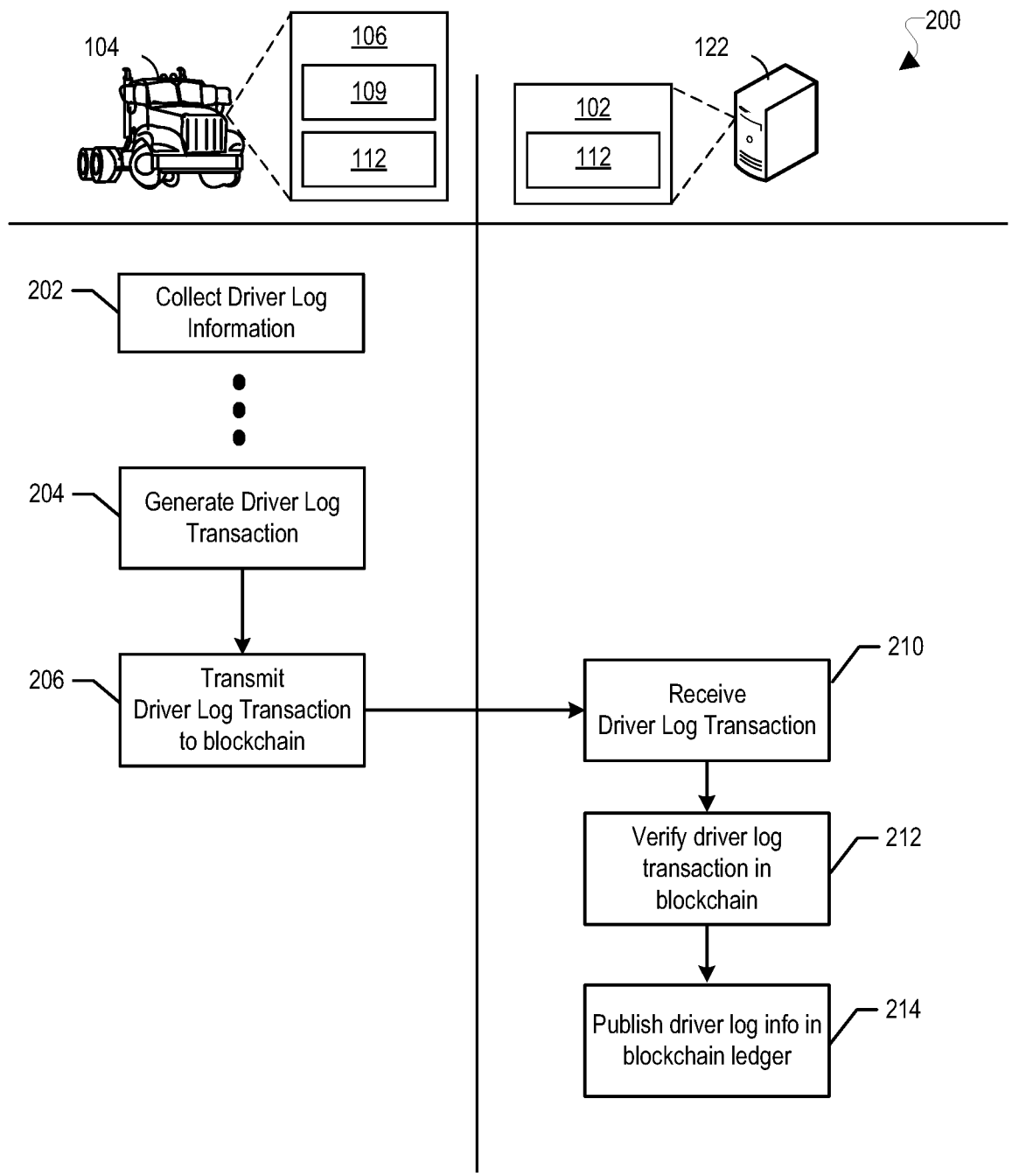
FIG. 2 is a flowchart of an aspect of a method of publishing driver log information to a blockchain ledger in accordance with the present disclosure.
Figure 3:
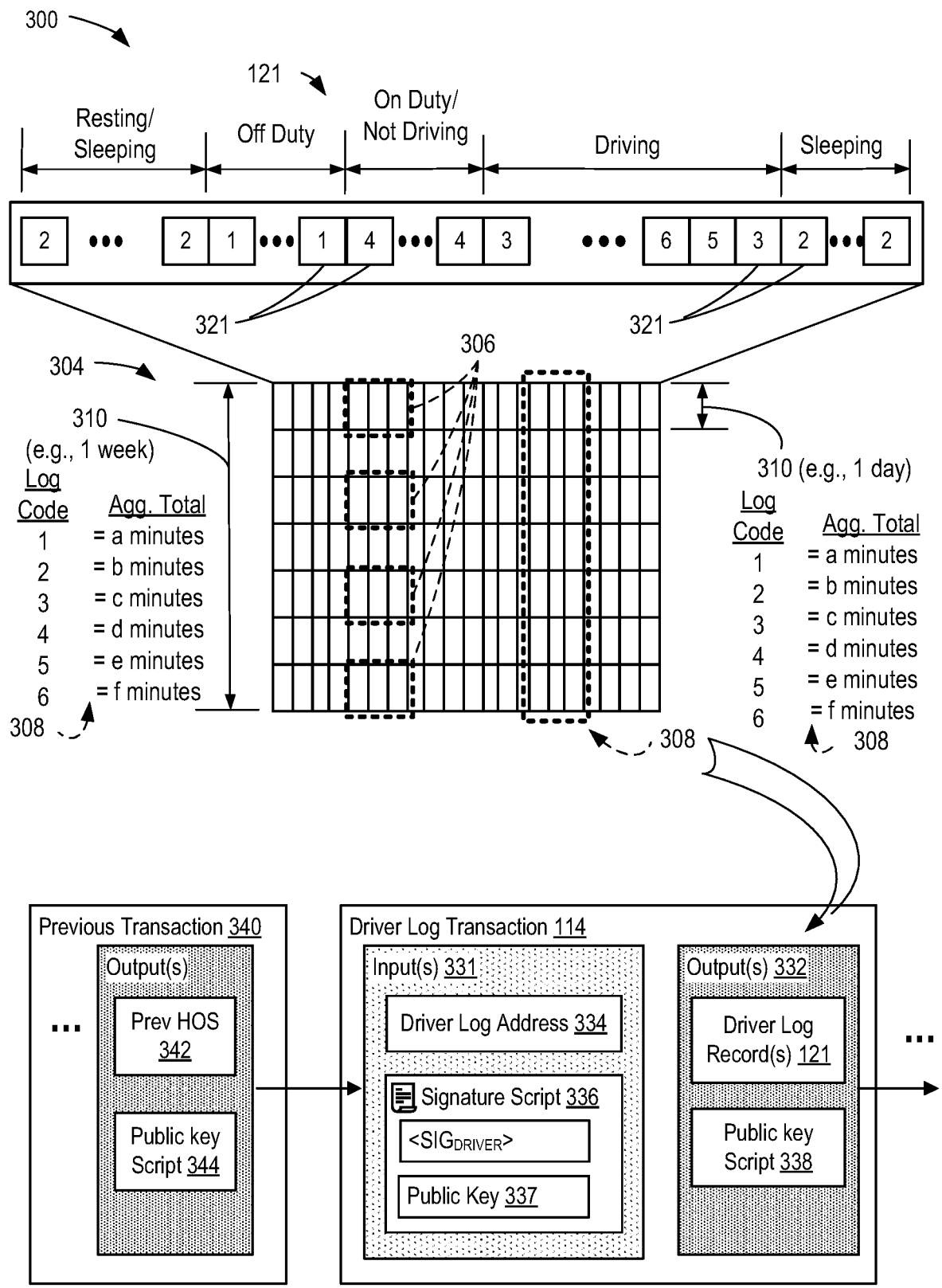
FIG. 3 is a schematic diagram of one example of the collection and aggregation of the driver log information, and the subsequent operation with a blockchain transaction data structure in accordance with the present disclosure.
Figure 4:
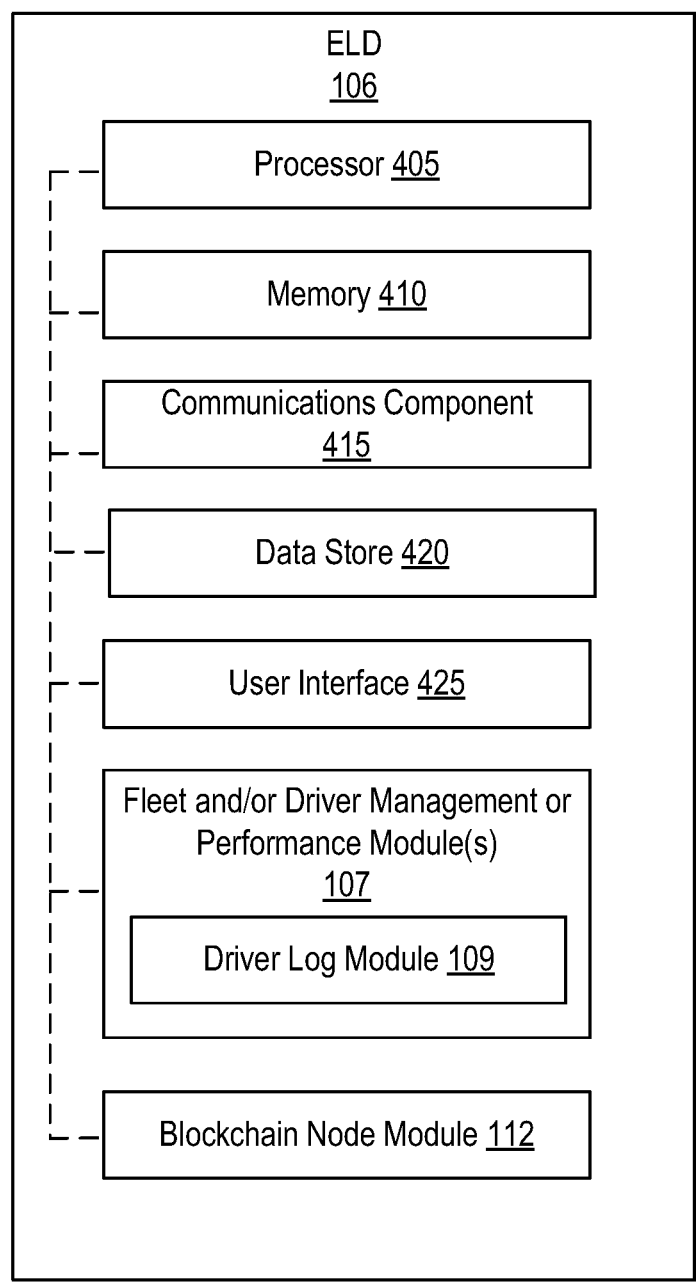
FIG. 4 is a block diagram of an example of an aspect of an electronic logging device (ELD) in accordance with the present disclosure.

Referring to FIGS. 2-4, an example of one implementation of a method 200 for processing and storing driver log information 121 in accordance with the present disclosure includes an interaction between a data center 102 and at least one designated ELD 106 associated with at least one vehicle 104 and at least one driver. In some aspects, the ELD(s) 106 may include driver log module 109 for collecting driver log information 121. Although the illustrated example shows the interaction between the blockchain node module 112 and the ELD 106, it should be understood that the blockchain node module 112 is not limited to receiving the driver log information 121 from the ELD 106 exclusively and may receive driver log information 121 from other blockchain nodes 122 as part of the distributed ledge operations. As discussed above, and referring for example to FIG. 3, one example of driver log information 121 includes a combination or sequence of log codes 321, where the value of each log code 321 represents a driver state (e.g., log code 321 having a value of: 1=off duty, 2=sleeping, 3=driving, 4=on duty but not driving, 5=yards moved, 6=personal conveyance) for an amount of time associated with each log code 321 (e.g., 1 log code/minute). So, for example, driver log module 109 may track which log code 321 applies to the driver for, for example, each minute of the day. As such, in one non-limiting example, driver log module 109 may track the driver log information 121 in a manner that represents the 24 hours in a driver's day as a sequence of 1440 log codes (60 log codes/minute×1 minute/hour×24 hours/day), where the sequence corresponds to some combination or sequence of different log code values.

As mentioned above, the ELD 106 may include a blockchain node module 112, which is configured to act as a blockchain client that packages and publishes driver log information 121 as blockchain transactions. It should be noted that this example implementation should not be construed as limiting, as one of skill in the art may modify this implementation and achieve similar results. For instance, rather than the illustrated actions of method 200 occurring at the ELD 106, the functionality associated with blockchain node module 112 may instead be implemented in the data center 102, which receives aggregates raw driver log information 121 from the ELD 106 and publishes the driver log information 121, using its own instance of a blockchain node module 112, as blockchain transactions on behalf of the ELD 106. Additionally, method 200 of FIG. 2 is discussed with further reference to FIG. 3, which includes a representation of the collected driver log information 121 and the generated driver log blockchain data structure described herein for publishing the information into the blockchain, and to FIG. 4, which includes a more detailed architectural implementation of the ELD 106.

In accordance with various aspects of the present disclosure, at 202, the method 200 may include collecting driver log information corresponding to one or more drivers of one or more vehicles. For example, in an aspect referring back to FIG. 1, driver log module 109 may periodically collect driver log information 121 associated with one or more drivers of one or more vehicles 104. In some aspects, for example, the driver log module 109 may execute code to generate a graphical user interface or other user input interface on a user interface, e.g., a display, of ELD 106, where the graphical user interface may be operable to receive an indication of driver log information 121 via manual inputs by the truck driver or via automatic collection based on the various sensors, or some combination of both. For instance, driver log module 109 may collect the driver log information 121 corresponding to a respective driver (e.g., a driver may log in or may provide an identifier to identify him/her self) once every minute based on a manual input by the truck driver of a current driver state (e.g., a log code, such as a code corresponding to "off duty," "sleeping/resting," "driving," and "on duty but not driving") at the user interface of the ELD 106. Further, in some aspects, driver log module 109 may maintain a clock or timer that tracks a time period associated with a current driver state (e.g., previously received log code) until receiving another manual input from the truck driver to change the current driver state.

For example, in an aspect that refers to FIG. 3, when a log code corresponding to "off duty" is received, then driver log module 109 can record a log code of "off duty" at that point in time and for every subsequent minute (or other periodic time of interest) until a different driver state is received. In particular, the driver log information 121 associated with the corresponding driver may include, for example, log code 321 having a variable value that indicates the driver state. As mentioned above, one example of the various values and driver states associated with log code 321 may include, but is not limited to, a value of 1 to represent "off duty," a value of 2 to represent "sleeping/resting," a value of 3 to represent "driving," a value of 4 to represent "on duty but not driving," a value of 5 may represent "yards moved," and a value of 6 may represent "personal conveyance."

At 204, the method 200 may include generating a blockchain transaction data structure associated with the driver and containing the driver log information 121 for that driver. For example, in an aspect, the blockchain node module 112 (e.g., executing on the ELD 106) may generate a driver log transaction 114 that is a blockchain transaction data structure having an input portion 331 and an output portion 332 that contains data fields that, among other features, associate the driver log transaction 114 with previous and next transactions according to blockchain methodology, as described in greater detail below. The terms "next" and "previous" are not used to necessarily mean strictly next/previous in a sequential or chained data structures as might be found in a linked list type of data structure. Rather, the terms "next" and "previous" are used to refer to next and previous entries in a conceptual chain of driver log entries associated with a given driver, which may include some or many intervening blockchain transactions within a blockchain record (block). An example blockchain transaction 114 is shown in object notation in Listing 1 below.

```
{
    current_txid : "02e29fc615909ef565a0184fe...",
    input: [ {
        previous_txid: "29516a91c72622a63692...",
        sigScript: {
            code: "<SIG_DRIVER> <PUB_KEY_DRIVER>",
            hex: "22223c3c235235237202070707726f6f7..."
        }
    } ],
    output: [ {
        hoursOfService: [
            {   timeStart: "0900",
                timeEnd: "1115",
                statusCode: "3"
            },
            {   timeStart: "1115",
                timeEnd: "1145",
                statusCode: "2"
            }
        ],
        pubKeyScript: {
            code: "OP_HASH hash(<PUBKEYHASH>)
                OP_EQUALVERIFY OP_CHECKSIG"
        }
    } ],
    time: 185683910678,
    blockhash: 00000000000000002533a414a3ab5cb0e5d...
}
```

Listing 1: Example Driver Log Transaction

In one aspect, the output portion 332 stores driver log information 121 and an associated public key script 338 that specifies conditions for publishing additional driver log information for this driver (described in detail below). The driver log information 121 may be hours-of-service data including at least one log code value representing a driving status and a corresponding time duration. For example, in an aspect, the blockchain node module 112 may generate an output portion 332 having a plurality of time entries that specify a first time duration of 3.2 hours and an associated driving status code of "3" (i.e., representing "driving"), and a second time duration of 0.5 hours and an associated driving status code of "2" to represent a sleeping or resting period. In an aspect, for example referring to FIG. 3, the driver log information 121 encapsulated in a driver log transaction 114 may include some sequence of driver log codes 321 for each driver corresponding to a respective vehicle 104, wherein the "sequence" of driver log codes 321 may represent a driver state over some period of time (e.g., which may depend on the frequency of uploading of driver log transactions 114 by ELD 106 (FIG. 1)). As such, the transmitted driver log information 121 may represent some portion of the set 304 (FIG. 3) of driver log information 121 collected for a predetermined time period 306 (FIG. 3), which may be aggregated into one or more subsets 308 (FIG. 3). Alternatively, or in addition, in some examples, ELD 106 may perform at least some part of the aggregating of driver log information 121 into one or more subsets 308 (FIG. 3). Accordingly, in such alternative or additional cases, the driver log transaction 114 may include a sequence of driver log codes 321 and additionally some aggregated subsets 308 of driver log information 121 as compiled by the driver log module 109 associated with the ELD 106.

The blockchain node module 112 may use the set of public and private encryption keys associated with the driver to form the public key script 338. The public key script 338 includes scripting code or executable instructions that are recorded with each driver log transaction and, when executed by a blockchain node, specifies one or more conditions that a party must satisfy to be permitted to correlate additional driver log information with the driver associated with the current driver log transaction 114. In other words, the public key script 338 describes how the driver log information recorded across different driver log transactions can be correlated to the same driver. For example, in an aspect, the public key script 338 may include scripting code for accepting and comparing one or more input values that are cryptographically-derived values. In one implementation, the public key script 338 may be configured to accept a digital signature of an ELD 106 as input and evaluate whether this input signature matches a copy of the public encryption key stored in the public key script 338 itself.

Turning to the input portion 331, the blockchain node module 112 may generate an input portion 331 that includes a cryptographic reference to a previous driver log transaction (e.g., previous transaction 340) for which the current driver log records 121 are an update. The cryptographic reference can be implemented using a driver log address 334 and a signature script 336. The driver log address 334 is a unique transaction identifier (e.g., "previous_txid") that refers to the previous transaction 340 having previous hours-of-service records 342 attributed to the same driver. In some cases, the driver log address 334 may have been prior generated and retained by the blockchain node module 112, so that the driver log address 334 can be retrieved at time of generating the transaction data structure 114. In other aspects, the driver log address 334 may be provided to the blockchain node module 112 as an input value so that a driver may continue to log their HOS records in the same chain of records. In some implementations, the driver log address 334 may be derived from values of the previous transaction 340, such as a hash or fingerprint value of the previous transaction 340.

The blockchain node module 112 may additionally use the set of public and private encryption keys associated with the driver to form a signature script 336 stored in the input portion 331. In an aspect, the signature script 336 includes scripting code or executable instructions that are recorded in the input portion 331 of the driver log transaction 114 and, when executed by a blockchain node, provides one or more input values (such as the driver's digital signature) used to satisfy the conditions of a public key script 344 of the prior transaction 340, which proves the current driver log transaction 114 is created by the actual driver and not another party. That is, the signature script 336 includes input values that satisfy the prior transaction's public key script 344 to correlate the driver log information 121 from the driver with the previous driver log transaction 114 (which is from the same driver).

In an aspect, the signature script 336 may include a copy of the driver's public encryption key 337 and a digital signature ("<SIG$_{DRIVER}$>"). The blockchain node module 112 may generate the digital signature using a private encryption key owned by the driver or the driver's ELD 106. This digital signature may encode certain transaction data, such as the driver log address 334, the driver log records 121, the current public key script 338, and the previous public key script 344 and be inserted into one of the fields of the blockchain transaction data structure itself. In an aspect, the digital signature may be a cryptographic hash of these data values in the transaction data structure 114 generated using elliptic curve cryptography, such as the Elliptic Curve Digital Signature Algorithm (ECDSA), or other forms of cryptographic algorithms such as the Digital Signature Algorithm (DSA). In this way, the digital signature advantageously prevents tampering and unauthorized modification of the driver's hours of service records when the ELD broadcasts these records to the blockchain network.

It is understood that other blockchain techniques for cryptographically tying together driver log transaction may be used. For example, a formulation similar to a "Pay To Script Hash" (P2SH) methodology may be used in which a redeem script is incorporated into the signature script 336. In this aspect, to verify the driver log transaction, the blockchain node module may extract the redeem script from the signature script field 336, decode the script, and be provided with the valid digital signature in addition to the correct redeem script.

Referring back to FIG. 2, at 206, method 200 may include transmitting the generated driver log transaction to the blockchain for processing and verification. In an aspect, the blockchain node module 112 of the ELD may broadcast the transaction to one or more blockchain nodes in the blockchain network. As described below, each peer node will independently validate the driver log transaction 114 before broadcasting the transaction further or attempting to include the transaction in a new block of transactions. For example, in an aspect, the ELD 106 and/or driver log module 109 may transmit a driver log transaction containing the driver log information 121 to a peer blockchain node module 112 (e.g., executing in the data center 102). In some examples, driver log module 109 and blockchain node module 112 may periodically (e.g., every x minutes, where x is a whole number, or once a day, or upon availability of a wired or wireless connection) transmit a blockchain transaction encapsulating the driver log information 121 created since the last period to the blockchain. For instance, the driver log transaction 114 may be transmitted from the ELD 106 to the peer blockchain node using the communications component 415 (see FIG. 4), e.g., a transceiver or modem, associated with ELD 106 over at least one communication channel (e.g., via satellite-based communication system 108 and a terrestrial-based system 110).

At 210, the method 200 may include receiving the driver log transaction associated with one or more drivers respectively corresponding to one or more vehicles. In an aspect, for example, the blockchain node 122 and/or the blockchain node module 112 may receive the driver log transaction 114 associated with one or more drivers respectively corresponding to one or more vehicles 104. For instance, referring to FIGS. 1 and 5, driver log information 121 may be received via at least one of a satellite-based communication system 108 (FIG. 1) and a terrestrial-based system 110 (FIG. 1), such as through communications component 515 (FIG. 5), e.g., a transceiver. Moreover, for instance, the received driver log transaction 114 may be further communicated to other blockchain nodes via a bus or other communication link (e.g., 111, 118) within the data center 102 or externally. Further, for example referring to FIG. 3, the received driver log transaction 114 may include some sequence of driver log codes 321 for each driver corresponding to a respective vehicle 104, wherein the "sequence" of driver log codes 321 may represent a driver state over some period of time (e.g., which may depend on the frequency of uploading of driver log transactions by ELD 106 (FIG. 1)).

At 212, the method 200 may include verifying the received driver log transaction 114 prior to publishing the driver log transaction in the blockchain. In an aspect, the peer blockchain node module 112 may cryptographically verify the driver log transaction by evaluating a script contained in the blockchain transaction data structure. For example, the peer blockchain node module 112 may evaluate the signature script 336 and the public key script 344 of the prior driver log transaction referred to by the prior transaction identifier (in that order). In one implementation, the blockchain node module provides a stack-based scripting system in which values left on the stack by the signature script 336 are evaluated by the public key script 344. The driver log transaction 114 is deemed verified and authorized by the correct driver of the vehicle if the output of the public key script 344 is "true" (i.e., the script evaluates to true).

At 214, the method 200 may include publishing the driver log transaction into the blockchain ledger. For example, in an aspect, responsive to determining that the scripting code of the referenced transaction 340 evaluates to true, the blockchain node module 112 may incorporate the verified driver log transaction 114 into a new or existing block of transactions, according to blockchain methodologies. In some aspects, the blockchain node module 112 may further transmit, broadcast, and otherwise share the verified driver log transaction 114 with peer blockchain nodes 122 in the blockchain network 120.

In some aspects, one or more of the blockchain node modules 112 may be configured to generate an audit blockchain transaction data structure having a smart contract or other scripting code configured to, when executed by a node in the blockchain network 120, certify compliance of the driver log information with one or more driving regulations. For example, such an HOS audit blockchain transaction data structure may be created by a blockchain node associated with an inspector, weigh station, or government regulator.

In an aspect, the HOS compliance process may be implemented using one or more function calls executed within a "smart contract" that is embedded in a special transaction data structure or even the driver log transaction 114 itself. The script may contain executable code which is configured to, when deployed on and executed by a node in the blockchain network 120, check that the driver log information 121 contained in a cryptographically referenced chain of driver log transactions complies with one or more time-based limits provided by predetermined regulations and rules. In one aspect, the smart contract for HOS compliance may allocate internal, dedicated storage of a blockchain node to be used by the smart contract to store state. This storage may be organized as a "map" data structure or associative array. The smart contract for HOS compliance may include a map data structure configured to store a running counter of driver log information mapped per driver. The smart contract may use this map data structure of driver logs to compare whether an aggregated amount of hours of service (e.g., having a driver status code representing "driving") exceeds or is less than a predetermined time limit. In some aspects, responsive to determining that the hours of service for a given driver complies with the rules, the smart contract may be configured to generate and publish a compliance-check transaction within the blockchain ledger. This compliance-check transaction certifies compliance of HOS regulations, and may be digitally signed by a private encryption key associated with the inspector or weigh station.

In an aspect, an organization that provides the ELDs 106 and fleet/driver management/performance modules 107 for use by vehicles and drivers (i.e., ELD service provider) may manage one or more encryption key sets for use by customers/users to directly inspect HOS logs without relying on direct web services (e.g., driver log report module 116) provided by that organization. The data center 102 (i.e., managed by ELD service provider) may instead be configured to issue to a third-party the appropriate encryption keys associated with a given driver's HOS transactions, which can then be used by that third party to access and verify the HOS logs published in the blockchain ledger 124. This improves the functioning of the computing system by providing a high availability characteristic to the HOS data, in contrast to known solutions, because the data integration points are decentralized while the security management remains centralized. In this way, third parties are able to utilize the HOS data for feature functionality that extends beyond the described services, while the ELD service provider retains the ability to "license" access to the data with the management of the security keys.

In another aspect, the blockchain network 120 may be configured as a permissioned blockchain network that applies an access control layer on top of the blockchain 124. This is another way in which third parties are permitted to use the HOS data for various features (e.g., analysis, auditing), while the ELD service provider retains the ability to "license" access to the data with the management of the permissioned blockchain. With a permissioned blockchain network, only pre-approved entities are permitted to execute blockchain nodes 122 that validate transaction blocks. For example, while any client (e.g., ELD 106) can submit transactions containing driver log information 121 to the blockchain for verification, the blockchain node 122 executing in the data center 102 and managed by the ELD service provider may be authorized to execute a blockchain node 122 that validates transaction blocks containing driver log information 121. In some aspects, only certain pre-approved entities (e.g., government regulators) are permitted to execute blockchain nodes 122 that execute smart contracts on the blockchain 124, such as smart contracts that verify compliance of the hours-of-service regulations. In some aspects, the permissioned blockchain network may define various roles such as a "reader" role, that can be used by an auditor or government regulator to read and analyze the driver log records found in the blockchain 124 (but not write to it) for compliance purposes; a "writer" role which has the ability to read and write to the blockchain 124, that can be used by an ELD 106 or other reporting devices; and an "operator" role which can perform management-related operations such as adding, removing, and/or authorizing with a particular role new members to the blockchain network 120. Such an operator role can be used by the ELD provider to more closely regulate and manage the operations of the blockchain network while still enabling distributed access (via different roles).

In aspects having a permissioned blockchain network, each blockchain node 122 may be configured to validate a block of transactions containing driver log information using a proof-of-stake algorithm to achieve a distributed consensus with other blockchain nodes in the network 120. For example, the blockchain nodes may use proof-of-stake algorithm such as a chain-based proof-of-stake algorithm, a *byzantine* fault tolerant (BFT)-style proof-of-stake algorithm, or Casper-related proof-of-stake algorithms used in Ethereum.

Referring to FIG. 4, in an example that should not be construed as limiting, ELD 106 may include additional components that operate in conjunction with driver management and/or performance module(s) 107 and driver log module 109, which may be implemented in specially programmed computer readable instructions or code, firmware, hardware, or some combination thereof.

In an aspect, for example as represented by the dashed lines, features described herein with respect to the functions of driver log module 109 may be implemented in or executed using one or any combination of processor 405, memory 410, communications module 415, and data store 420. For example, driver management or performance module(s) 107, driver log module 109, and blockchain node module 112 may be defined or otherwise programmed as one or more processor modules of processor 405. Further, for example, driver management or performance module(s) 107, driver log module 109, and blockchain node module 112 may be defined as a computer-readable medium (e.g., a non-transitory computer-readable medium) stored in memory 410 and/or data store 420 and executed by processor 405. Moreover, for example, inputs and outputs relating to operations of driver management or performance module(s) 107, driver log module 109, and blockchain node module 112 may be provided or supported by communications module 415, which may provide a bus between the modules of computer device or an interface for communication with external devices or modules.

Processor 405 can include a single or multiple set of processors or multi-core processors. Moreover, processor 405 can be implemented as an integrated processing system and/or a distributed processing system.

Memory 410 may operate to allow storing and retrieval of data used herein and/or local versions of applications and/or software and/or instructions or code being executed by processor 405, such as to perform the respective functions of driver log module 109 described herein. Memory 410 can include any type of memory usable by a computer, such as random access memory (RAM), read only memory (ROM), tapes, magnetic discs, optical discs, volatile memory, non-volatile memory, and any combination thereof.

Communications module 415 is operable to establish and maintain communications with one or more internal components/modules or external devices utilizing hardware, software, and services as described herein. Communications component 415 may carry communications between modules on ELD 106, as well as between user and external devices, such as devices located across a communications network and/or devices serially or locally connected to ELD 106. For example, communications component 415 may include one or more buses, and may further include transmit chain modules and receive chain modules associated with a transmitter and receiver, respectively, or a transceiver, operable for interfacing with external devices.

Additionally, data store 420, which can be any suitable combination of hardware and/or software, which provides for mass storage of information, databases, and programs employed in connection with aspects described herein. For example, data store 420 may be a data repository for applications not currently being executed by processor 405.

ELD 106 may additionally include a user interface module 425 operable to receive inputs from a user, and further operable to generate outputs for presentation to the user. User interface module 425 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 425 may include one or more output devices, including but not limited to a display, a speaker, a haptic feedback mechanism, a printer, any other mechanism capable of presenting an output to a user, or any combination thereof.

Figure 5:
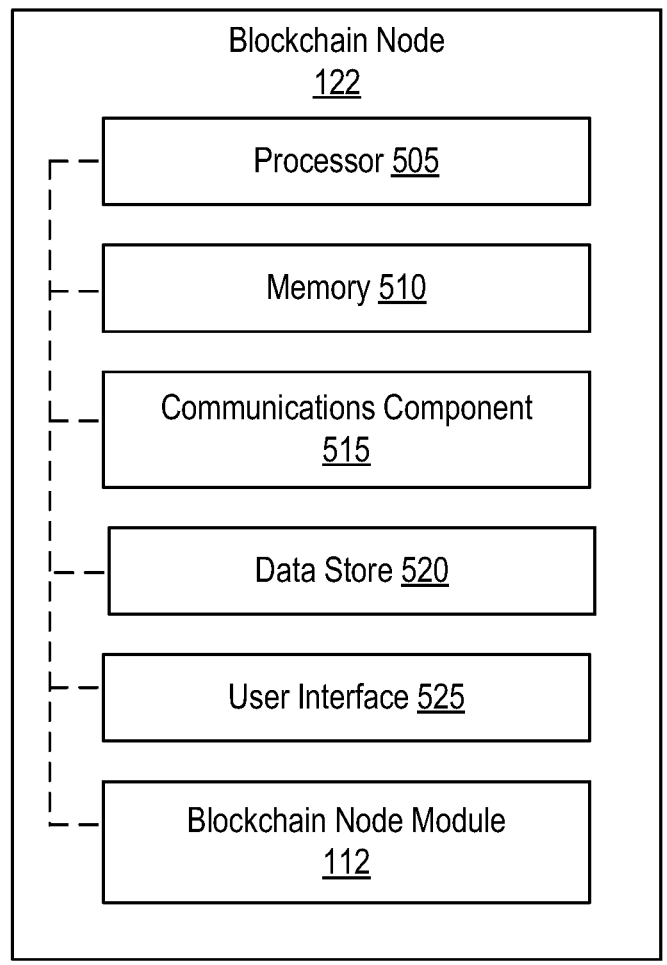
FIG. 5 is a block diagram of an example of an aspect of a blockchain node in accordance with the present disclosure.

Referring to FIG. 5, in an example that should not be construed as limiting, a blockchain node 122 (e.g., executing in a data center 102) may include additional components for verifying and publishing driver log data in a blockchain and in particular for operating in conjunction with the blockchain node module 112, which may be implemented in specially programmed computer readable instructions or code, firmware, hardware, or some combination thereof.

In an aspect, for example as represented by the dashed lines, the features of the blockchain node module 112 described herein may be implemented in or executed using one or any combination of processor 505, memory 510, communications component 515, and data store 520. For example, blockchain node module 112 may be defined or otherwise programmed as one or more processor modules of processor 505. Further, for example, blockchain node module 112 may be defined as a computer-readable medium (e.g., a non-transitory computer-readable medium) stored in memory 510 and/or data store 520 and executed by processor 505.

Processor 505 can include a single or multiple set of processors or multi-core processors. Moreover, processor 505 can be implemented as an integrated processing system and/or a distributed processing system.

Memory 510 may be operable for storing and retrieving data used herein and/or local versions of applications and/or software and/or instructions or code being executed by processor 505, such as to perform the respective functions of the respective entities described herein. Memory 510 can include any type of memory usable by a computer, such as random access memory (RAM), read only memory (ROM), tapes, magnetic discs, optical discs, volatile memory, non-volatile memory, and any combination thereof.

Communications component 515 may be operable to establish and maintain communications with one or more internal components/modules and/or external devices utilizing hardware, software, and services as described herein. Communications component 515 may carry communications between peer blockchain nodes 122 within a data center 102 or elsewhere in the blockchain network 120, as well as between user and external devices, such as devices located across a communications network and/or devices serially or locally connected to the blockchain node 122. For example, communications component 515 may include one or more buses, and may further include transmit chain modules and receive chain modules associated with a transmitter and receiver, respectively, or a transceiver, operable for interfacing with external devices.

Additionally, data store 520, which can be any suitable combination of hardware and/or software, which provides for mass storage of information, databases, and programs employed in connection with aspects described herein. For example, data store 520 may be a data repository for applications not currently being executed by processor 132.

In instances in which the blockchain node 122 is executing in a data center with a driver log report module 116, the blockchain node 122 may additionally include a user interface module 525 operable to receive inputs from a user, and further operable to generate outputs for presentation to the user. User interface module 525 may include one or more input devices, including but not limited to a keyboard, a number pad, a mouse, a touch-sensitive display, a navigation key, a function key, a microphone, a voice recognition module, any other mechanism capable of receiving an input from a user, or any combination thereof. Further, user interface module 525 may include one or more output devices, including but not limited to a display, a speaker, a haptic feedback mechanism, a printer, any other mechanism capable of presenting an output to a user, or any combination thereof.

In view of the disclosure above, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the FIGS. which may illustrate various process flows.

In the above description, the term "software product" may include files having executable content, such as: object code, scripts, byte code, markup language files, and patches. In addition, a "software product" referred to herein, may also include files that are not executable in nature, such as documents that may need to be opened or other data files that need to be accessed.

The term "software update" may also include files having executable content, such as: object code, scripts, byte code, markup language files, and patches. In addition, "software update" referred to herein, may also include files that are not executable in nature, such as documents that may need to be opened or other data files that need to be accessed.

As used in this description, the terms "module," "database," "module," "system," and the like are intended to refer to a computer-related entity, either hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device may be a module. One or more modules may reside within a process and/or thread of execution, and a module may be localized on one computer and/or distributed between two or more computers. In addition, these modules may execute from various computer readable media having various data structures stored thereon. The modules may communicate by way of local and/or remote processes such as in accordance with a signal having one or more data packets (e.g., data from one module interacting with another module in a local system, distributed system, and/or across a network such as the Internet with other systems by way of the signal).

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blue-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A transport driver log system, comprising:
    a processing system configured for:
        receiving, by a driver log module, driver log information associated with one or more drivers respectively corresponding to one or more vehicles, wherein the driver log information contains hours-of-service data associated with the driver;
        outputting, by the driver log module, to a peer blockchain module, the received driver log information;
        receiving, by the peer blockchain module, the outputted driver log information;
        generating, by the peer blockchain module, a blockchain transaction data structure having an input portion and an output portion, wherein the input portion of the blockchain transaction data structure comprises a cryptographic reference to a previous transaction data structure associated with the driver, and the output portion stores the hour s-of-service data including at least one log code value representing a driving status and a corresponding time duration; and
        publishing, by the peer blockchain module, the blockchain transaction data structure to a blockchain network, wherein the transport driver log system is a node within the blockchain network and comprises an electronic logging device (ELD).

2. The transport driver log system of claim 1, wherein the previous blockchain transaction data structure stores other driver log information associated with the driver.

3. The transport driver log system of claim 1, wherein the blockchain transaction data structure includes a blockchain address associated with the driver.

4. The transport driver log system of claim 1, wherein the driver log information is cryptographically verified by evaluating a script contained in the blockchain transaction data structure.

5. An apparatus for logging transport driver information, comprising:
    a processor; and
    a non-transitory memory coupled with the processor, wherein the memory includes instructions when executed by the processor causes the processor to perform the steps of:
        receiving, by a driver log module, driver log information associated with one or more drivers respectively corresponding to one or more vehicles, wherein the driver log information contains hours-of-service data associated with the driver;
        outputting, by the driver log module, to a peer blockchain module, the received driver log information;
        receiving, by the peer blockchain module, the outputted driver log information;
        generating, by the peer blockchain module, a blockchain transaction data structure having an input portion and an output portion, wherein the input portion of the blockchain transaction data structure comprises a cryptographic reference to a previous transaction data structure associated with the driver, and the output portion stores the hours-of-service data including at least one log code value representing a driving status and a corresponding time duration; and
        publishing, by the peer blockchain module, the blockchain transaction data structure to a blockchain network, wherein the apparatus is a node within the blockchain network and comprises an electronic logging device (ELD).

6. The apparatus of claim 5, wherein the previous blockchain transaction data structure stores additional driver log information associated with the driver.

7. The apparatus of claim 5, wherein the blockchain transaction data structure includes a blockchain address associated with the driver.

8. The apparatus of claim 5, wherein the driver log information is cryptographically verified by evaluating a script contained in the blockchain transaction data structure.

9. A method for managing driver log information, comprising:
    receiving, by a driver log module, driver log information associated with one or more drivers respectively corresponding to one or more vehicles, wherein the driver log information contains hours-of-service data associated with the driver;
    outputting, by the driver log module, to a peer blockchain module, the received driver log information;
    receiving, by the peer blockchain module, the outputted driver log information;
    generating, by the peer blockchain module, a blockchain transaction data structure having an input portion and an output portion, wherein the input portion of the blockchain transaction data structure comprises a cryptographic reference to a previous transaction data structure associated with the driver, and the output portion stores the hours-of-service data including at least one log code value representing a driving status and a corresponding time duration; and
    publishing the blockchain transaction data structure to a blockchain network, wherein the driver log module and peer blockchain module are part of a node within the blockchain network and comprises an electronic logging device (ELD).

10. The method of claim 9, wherein the previous transaction data structure stores additional driver log information associated with the driver.

11. The method of claim 9, wherein the blockchain transaction data structure includes a blockchain address associated with the driver.

12. The method of claim 9, wherein the driver log information is cryptographically verified by evaluating a script contained in the blockchain transaction data structure.

* * * * *